United States Patent
Li et al.

(10) Patent No.: US 9,745,851 B2
(45) Date of Patent: Aug. 29, 2017

(54) METAL LEADING EDGE ON COMPOSITE BLADE AIRFOIL AND SHANK

(71) Applicant: General Electric Company, Schenectady, NY (US)

(72) Inventors: Qiang Li, Mason, OH (US); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 310 days.

(21) Appl. No.: 14/597,278

(22) Filed: Jan. 15, 2015

(65) Prior Publication Data

US 2016/0208615 A1    Jul. 21, 2016

(51) Int. Cl.
*F01D 5/14* (2006.01)
*F01D 5/28* (2006.01)
*F01D 5/30* (2006.01)

(52) U.S. Cl.
CPC ............. *F01D 5/147* (2013.01); *F01D 5/143* (2013.01); *F01D 5/282* (2013.01); *F01D 5/3007* (2013.01);
(Continued)

(58) Field of Classification Search
CPC .......... F01D 5/143; F01D 5/147; F01D 5/282; F01D 5/3007; F05D 2200/36;
(Continued)

(56) References Cited

U.S. PATENT DOCUMENTS

| 3,892,612 A | * | 7/1975 | Carlson | ................... F01D 5/282 |
| | | | | 156/150 |
| 4,006,999 A | * | 2/1977 | Brantley | ................. F01D 5/282 |
| | | | | 416/224 |

(Continued)

FOREIGN PATENT DOCUMENTS

| EP | 2037082 A1 | 3/2009 |
| EP | 2348192 A2 | 7/2011 |

(Continued)

OTHER PUBLICATIONS

European Search Report and Written Opinion issued in connection with corresponding EP Application No. 16151153.0 on May 24, 2016.

(Continued)

*Primary Examiner* — Igor Kershteyn
(74) *Attorney, Agent, or Firm* — General Electric Company; William Scott Andes

(57) ABSTRACT

A composite blade includes a composite airfoil section having airfoil pressure and suction sides extending chordwise between airfoil leading and trailing edges, a dovetail root attached to airfoil section and a blade shank therebetween, and a metallic leading edge shield covering an axially extending portion of airfoil section including at least a portion of airfoil leading edge and a radially and chordwise extending portion of a leading edge portion of the blade shank. Leading edge portion may be cut back from airfoil leading edge and a shank leading edge aft or downstream of airfoil leading edge. A nose may extend along a shield (Continued)

leading edge of the metallic leading edge shield with pressure and suction side legs extending aftwardly from nose along airfoil pressure and suction sides. Light weight insert may be located between nose and airfoil leading edges.

22 Claims, 6 Drawing Sheets

(52) U.S. Cl.
CPC ...... *F05D 2200/36* (2013.01); *F05D 2220/32* (2013.01); *F05D 2240/303* (2013.01); *F05D 2300/10* (2013.01); *Y02T 50/672* (2013.01); *Y02T 50/673* (2013.01)

(58) Field of Classification Search
CPC ........... F05D 2220/32; F05D 2240/303; F05D 2300/10; Y02T 50/672; Y02T 50/673
See application file for complete search history.

(56) References Cited

U.S. PATENT DOCUMENTS

| | | | |
|---|---|---|---|
| 4,738,594 A * | 4/1988 | Sato | F04D 29/388 416/213 A |
| 5,439,353 A | 8/1995 | Cook et al. | |
| 5,965,240 A | 10/1999 | Blackburn et al. | |
| 6,132,857 A | 10/2000 | Champenois et al. | |
| 6,416,280 B1 | 7/2002 | Forrester et al. | |
| 7,510,778 B2 | 3/2009 | Bernard et al. | |
| 7,744,346 B2 | 6/2010 | Schreiber et al. | |
| 7,780,410 B2 | 8/2010 | Kray et al. | |
| 7,805,839 B2 | 10/2010 | Cammer | |
| 7,918,652 B2 | 4/2011 | Fujimura | |
| 8,137,073 B2 | 3/2012 | Giusti et al. | |
| 8,657,570 B2 | 2/2014 | Kray et al. | |
| 2008/0253922 A1 | 10/2008 | Trimmer et al. | |
| 2009/0025365 A1 | 1/2009 | Schilling et al. | |
| 2009/0074586 A1 | 3/2009 | Le Hong et al. | |
| 2010/0329863 A1 | 12/2010 | Kray et al. | |
| 2011/0027096 A1 | 2/2011 | Northfield | |
| 2011/0049297 A1 | 3/2011 | Jevons et al. | |
| 2011/0182740 A1 * | 7/2011 | Klinetob | F01D 5/147 416/224 |
| 2011/0182741 A1 | 7/2011 | Alexander | |
| 2011/0211967 A1 | 9/2011 | Deal et al. | |
| 2011/0229334 A1 | 9/2011 | Alexander | |
| 2012/0003100 A1 | 1/2012 | James et al. | |
| 2012/0301292 A1 | 11/2012 | Deal et al. | |
| 2013/0028661 A1 | 1/2013 | Screaton | |
| 2013/0101423 A1 * | 4/2013 | Roy | F01D 5/147 416/223 R |
| 2013/0323065 A1 * | 12/2013 | Murooka | F01D 5/141 416/219 R |
| 2014/0030105 A1 | 1/2014 | Fameau et al. | |
| 2014/0212295 A1 | 7/2014 | Kray et al. | |
| 2014/0219805 A1 | 8/2014 | Lamboy et al. | |
| 2015/0377030 A1 * | 12/2015 | Murdock | F01D 5/147 416/224 |
| 2016/0010468 A1 * | 1/2016 | Kray | B23P 15/04 415/200 |
| 2016/0177969 A1 | 6/2016 | Schreiber et al. | |

FOREIGN PATENT DOCUMENTS

| | | |
|---|---|---|
| EP | 2586972 A2 | 5/2013 |
| EP | 2660475 A1 | 11/2013 |
| EP | 2811143 A1 | 12/2014 |
| EP | 3015646 A1 | 5/2016 |
| EP | 3023588 A1 | 5/2016 |
| EP | 3034788 A2 | 6/2016 |
| WO | WO 2014/133546 | 4/2014 |
| WO | WO 2014/066503 A1 | 5/2014 |
| WO | WO 2014/066508 A2 | 5/2014 |
| WO | 2014143262 A1 | 9/2014 |

OTHER PUBLICATIONS

European Office Action issued in connection with corresponding EP Application No. 16151153.0 dated Jun. 8, 2017.

* cited by examiner

METAL LEADING EDGE ON COMPOSITE BLADE AIRFOIL AND SHANK

BACKGROUND OF THE INVENTION

Field of the Invention

The present invention relates generally to fan blades for gas turbine engine fan assemblies and, more specifically, metal leading edges for fan blades.

Description of Related Art

Aircraft turbofan gas turbine engines include a fan assembly having a plurality of circumferentially spaced apart fan blades extending radially outwardly from a rotor disk. Ambient airflow is channeled between the blades and pressurized thereby generating thrust for powering the aircraft in flight. The fan assembly typically includes a plurality of circumferentially spaced apart fan blades each having an airfoil attached to a dovetail root disposed in a complementary, axially extending dovetail groove or slot in a perimeter or rim of a rotor disk or drum. The airfoil may be attached to the dovetail root by a shank. A spinner is mounted to a front end of the fan assembly to provide smooth airflow into the fan as illustrated in U.S. Pat. No. 6,416,280, by Forrester et al., entitled "One Piece Spinner", which issued Jul. 9, 2002.

In order to make engines more efficient, there are efforts to decrease the fan blade radius ratio (RR) which is a ratio of inner fan flowpath diameter/outer flowpath diameter and which indicates how much airflow can be passed through the engine. A smaller radius ratio (RR) results in a larger flow area, and better performance. As the fan blade radius ratios decrease by moving the fan platform flowpath surface inboard towards an engine centerline or axis, the fan blade leading edge profile along the airfoil and a portion of the shank begins to become larger and abrupt. RR may be decreased by increasing the outer fan diameter or making the inner flowpath and inner flowpath diameter smaller which is preferred. Increasing the overall fan diameter is less desirable because it increases drag.

Maximizing a low radius ratio design results in the blade LE profile along the airfoil and shank being more exposed to the aerodynamic flow path. This exposed LE needs to be protected from erosion as well as birdstrike damage. In addition, flatness of the exposed shank leading edge portion is an aerodynamic drag penalty during operation resulting in a fuel consumption penalty.

Thus, there is a need to protect areas of the fan blades shank that are exposed to airflow, erosion, and birdstrike. There is also a need to reduce aerodynamic drag of the exposed flat leading edge of the fan blade shank.

SUMMARY OF THE INVENTION

A gas turbine engine fan blade includes a composite blade having a composite airfoil section with airfoil pressure and suction sides extending chordwise or axially between chordwise or axially spaced apart airfoil leading and trailing edges. The composite blade further includes a dovetail root attached to the composite airfoil section with a blade shank therebetween and a metallic leading edge shield covering an axially extending portion of the composite airfoil section including at least a portion of the airfoil leading edge and a radially and chordwise extending portion of a leading edge portion of the blade shank.

The airfoil section may be cambered and the dovetail root may be axially extending curved or straight and the airfoil section may include a transition region of the blade shank extending between the airfoil section and the dovetail root and transitioning the composite blade between the cambered airfoil section and the axially extending curved or straight dovetail root.

The leading edge portion of the blade shank may be cut back from the airfoil leading edge and a shank leading edge may be aft or downstream of the airfoil leading edge.

The metallic leading edge shield may include a nose extending along a shield leading edge and having pressure and suction side legs extending aftwardly or downstream from the nose along the airfoil pressure and suction sides respectively of the composite airfoil section.

The nose may be a substantially solid metal nose. A space may be located between the nose and the airfoil and shank leading edges. An insert may be located between the nose and the airfoil and shank leading edges. The insert may be made from a group of materials including adhesives, epoxies, and metals that are lighter in weight than that of the nose.

A gas turbine engine fan assembly including a fan rotor disk or drum, a row of circumferentially spaced apart composite fan blades (such as the composite fan blades disclosed above) extending radially outwardly from the fan rotor disk or drum. The fan assembly may also include a spinner joined to the fan rotor disk or drum and the radially and chordwise extending portion extending radially outwardly or outboard from the spinner.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
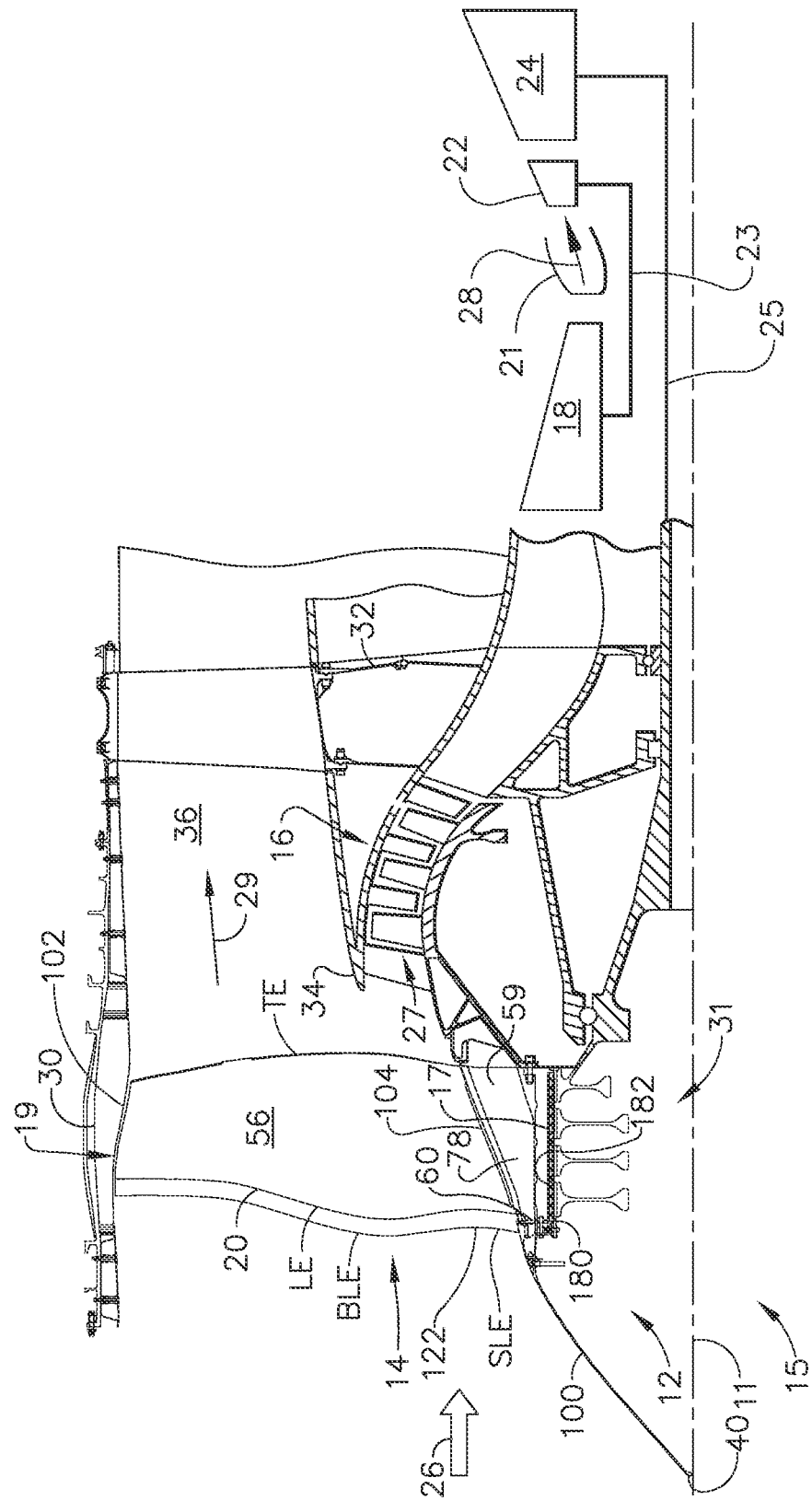
FIG. 1 is a schematic cross-sectional view illustration of a fan section of a gas turbine engine incorporating fan blades constructed in accordance with an aspect of the present invention.

Illustrated in FIG. 1 is an exemplary aircraft turbofan gas turbine engine 15 circumscribed about an engine centerline axis 11 and suitably designed to be mounted to a wing or fuselage of an aircraft. The engine 15 includes, in downstream serial flow communication, a fan 14, a booster or a low pressure compressor 16, a high pressure compressor 18, a combustor 21, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and booster or low pressure compressor 16.

In typical operation, air 26 is pressurized by the fan 14 and an inner portion of this air is channeled through the low pressure compressor 16 which further pressurizes the air. The pressurized air is then flowed to the high pressure compressor 18 which further pressurizes the air. The pressurized air is mixed with fuel in the combustor 21 for generating hot combustion gases 28 that flow downstream, in turn, through the HPT 22 and the LPT 24. Energy is extracted in the two turbines for powering the fan 14, low pressure compressor 16, and the high pressure compressor 18. A flow splitter 34 surrounding the booster compressor 16 immediately behind the fan 14 includes a sharp leading edge which splits the fan air 26 pressurized by the fan 14 into a radially inner stream 27 channeled through the booster compressor 16 and a radially outer stream 29 channeled through the bypass duct 36.

Figure 2:
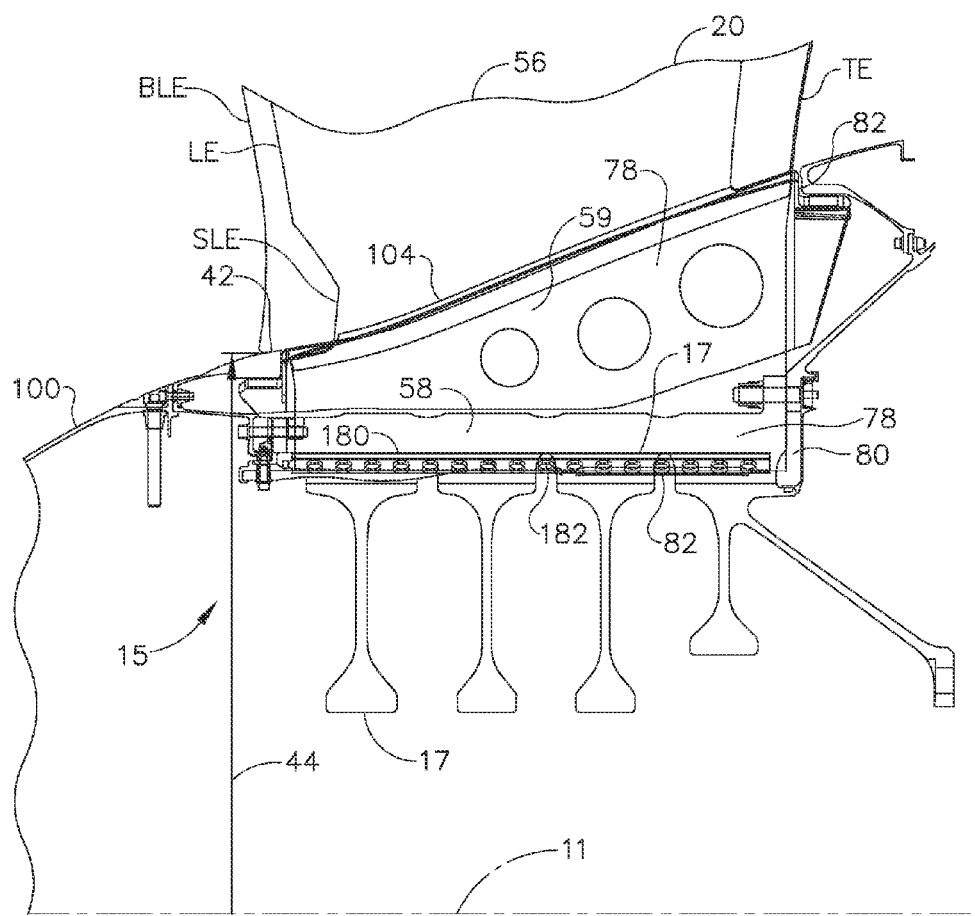
FIG. 2 is an enlarged schematic view illustration of a portion of the fan blade with a composite airfoil connected to a shank covered with a metallic leading edge shield illustrated in FIG. 1.

Referring to FIGS. 1 and 2, a fan assembly 31 of the engine 15 includes the fan 14 and a fan nacelle 30 surrounding the fan 14 and being supported by an annular fan frame 32. The low pressure compressor 16 is suitably joined to the fan 14 forward of the fan frame 32, is located radially inboard of the annular flow splitter 34, and is spaced radially inwardly from an inner surface of the fan nacelle 30 to partially define an annular fan bypass duct 36 therebetween. The fan frame 32 supports the nacelle 30. The fan 14 includes a drum or a fan rotor disk 17 from which extends radially outwardly a single axially located row 19 of circumferentially spaced apart fan blades 12. A spinner 100 is joined to the fan rotor disk 17 to provide an aerodynamic flow path for air 26 entering the fan 14. The spinner 100 extends downstream or aftwardly from a spinner tip 40 to a spinner aft end 42. The spinner 100 has an aft end radius 44 at the spinner aft end 42 and which may be the maximum radius of the spinner 100.

Figure 8:
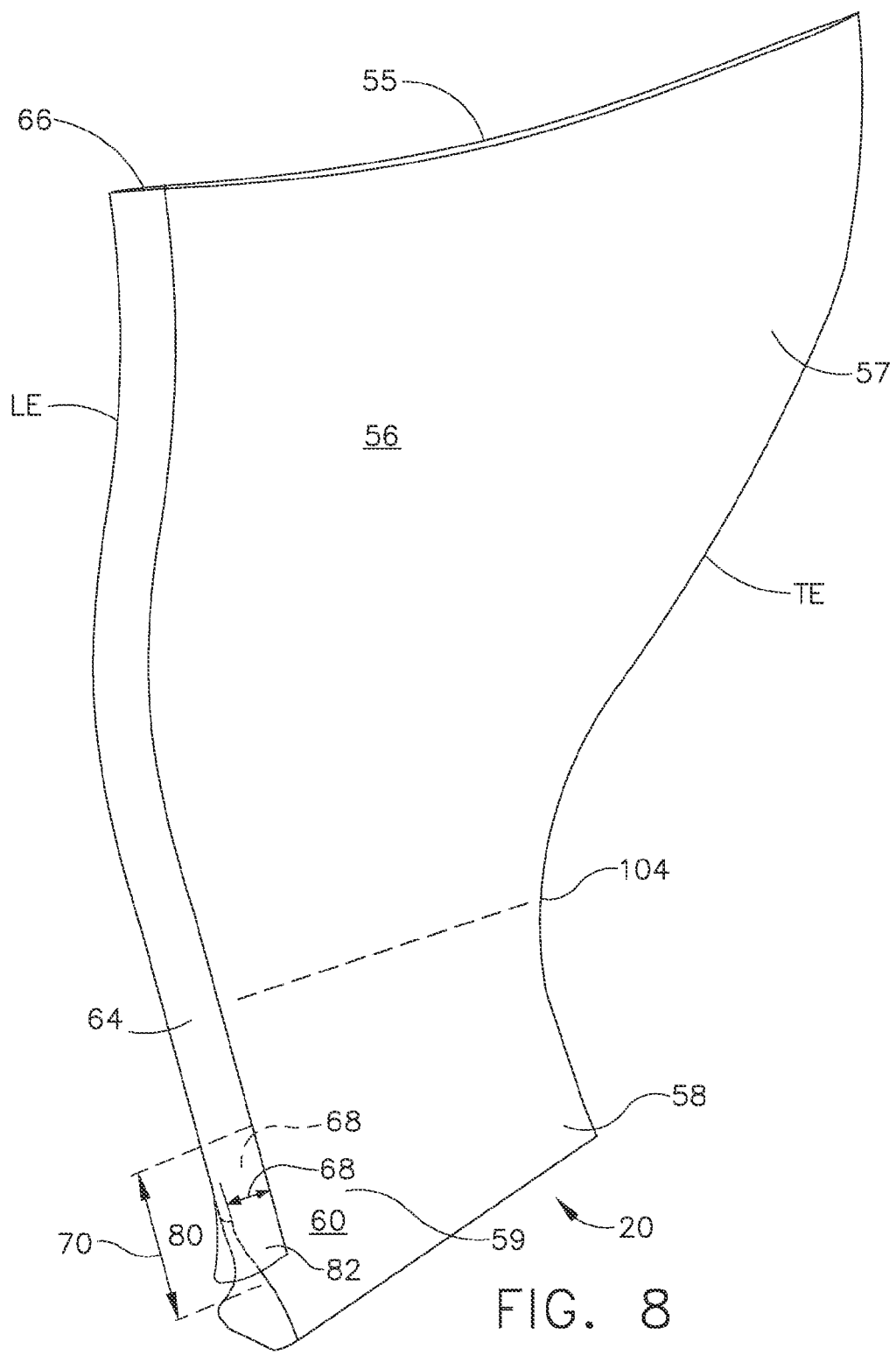
FIG. 8 is a schematic perspective view illustration of the fan blade illustrated in FIG. 1.

Referring to FIGS. 1, 2, and 8, each of the fan blades 12 includes a composite blade 20 having a curved or cambered composite airfoil section 56 with airfoil pressure and suction sides 55, 57 extending axially between axially spaced apart airfoil leading and trailing edges LE and TE. The composite blade 20 further includes the airfoil section 56 attached to and preferably integral and integrally formed with a dovetail root 58 and a blade shank 59 therebetween. The blade shank 59 includes a transition region 60 and extends between the airfoil section 56 and the dovetail root 58. The transition region 60 transitions the composite blade 20 between the cambered airfoil section 56 and the axially extending curved or straight dovetail root 58. The dovetail root 58 is disposed in a complementary, axially extending dovetail slot 78 in a perimeter 180 or rim 182 of a rotor disk 17.

The composite blades 20 may be constructed from a composite layup. The term "composite" refers generally to a material containing a reinforcement such as fibers or particles supported in a binder or matrix material. The composite layup may include a number of layers or plies embedded in a matrix and oriented substantially parallel to the pressure and suction sides 55, 57. A non-limiting example of a suitable material is a carbonaceous (e.g. graphite) fiber embedded in a resin material such as epoxy. These are commercially available as fibers unidirectionally aligned into a tape that is impregnated with a resin. Such "prepreg" tape can be formed into a part shape, and cured via an autoclaving process or press molding to form a light weight, stiff, relatively homogeneous article.

Figure 4:
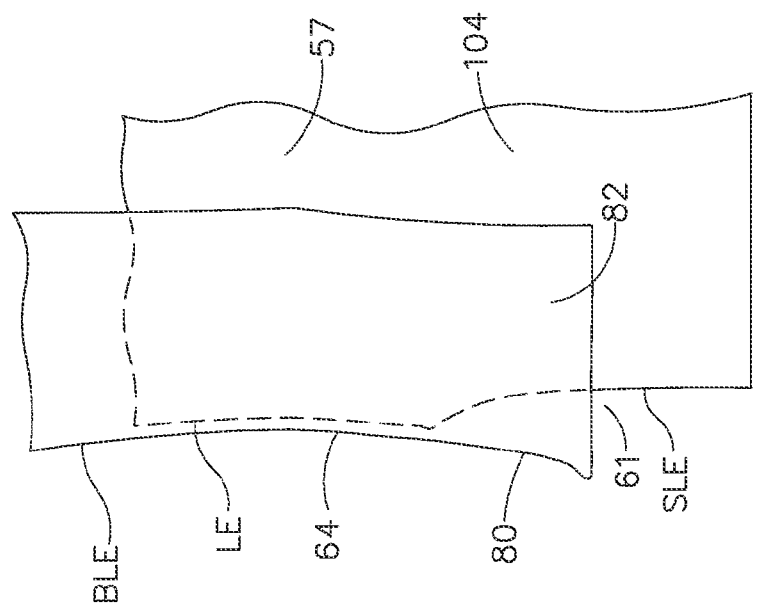
FIG. 4 is a diagrammatical cross-sectional schematic view illustration of the portion of the fan blade airfoil and the shank illustrated in FIG. 2.
Figure 3:
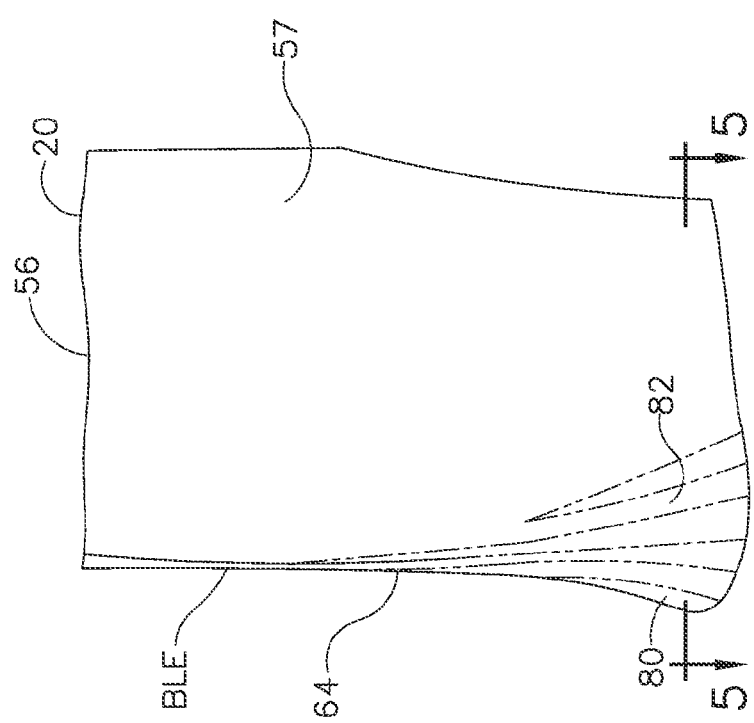
FIG. 3 is a diagrammatical perspective view illustration of the portion of the fan blade airfoil connected to the shank illustrated in FIG. 2.
Figure 6:
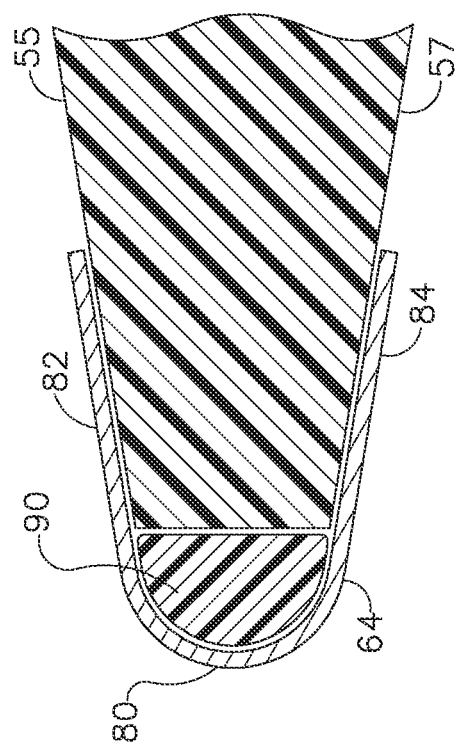
FIG. 6 is a diagrammatical cross-sectional view schematic illustration of an alternate embodiment for the metal leading edge shield around the composite airfoil illustrated in FIG. 5.
Figure 5:
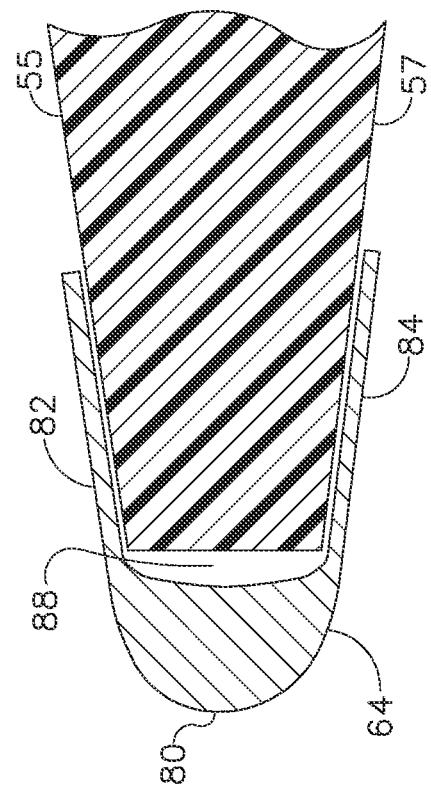
FIG. 5 is a diagrammatical cross-sectional view schematic illustration of the metal leading edge shield around the composite airfoil through 5-5 in FIG. 3.
Figure 7:
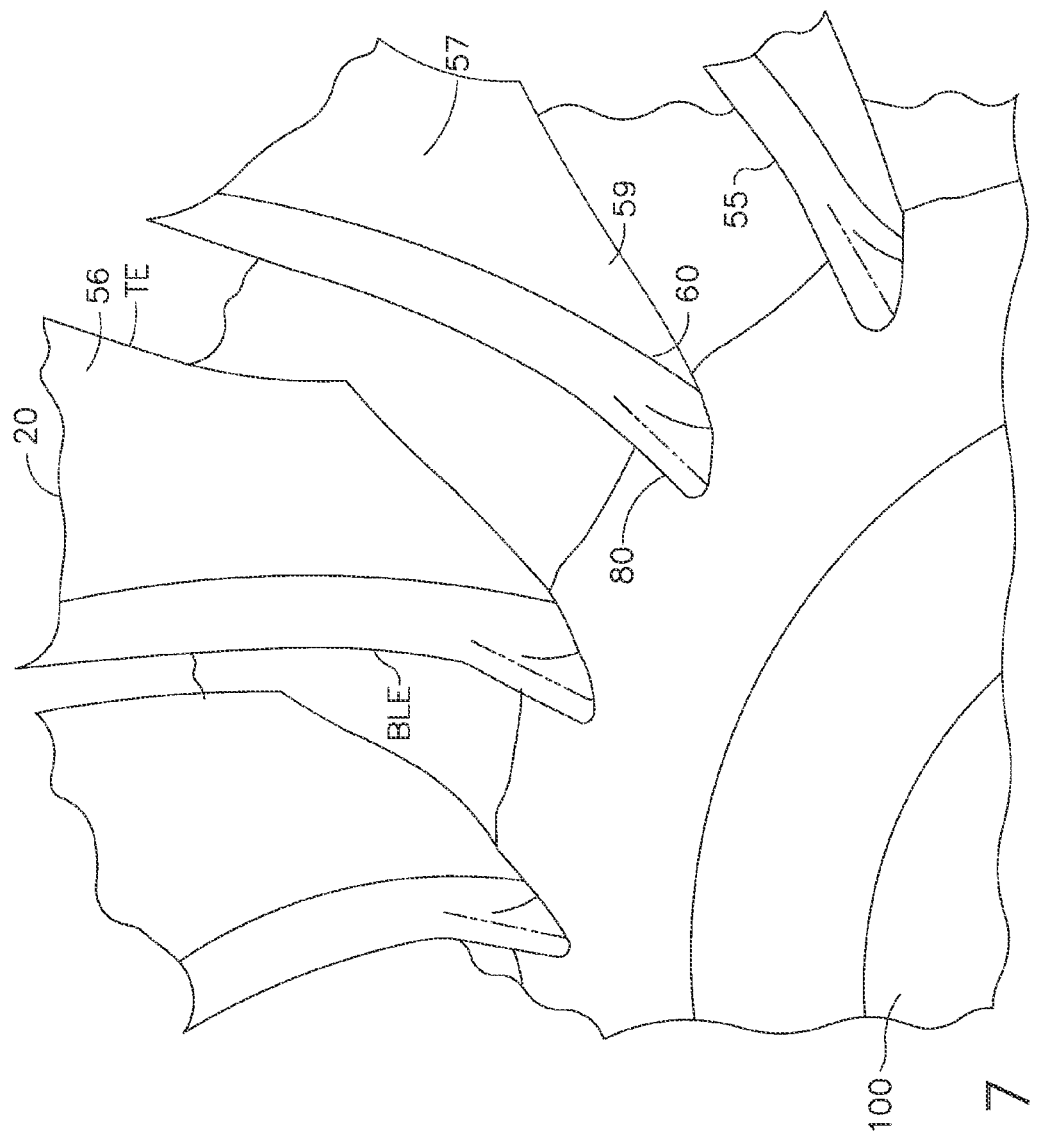
FIG. 7 is a schematic perspective view illustration of portions of the fan blades and a portion of a spinner in the fan section in the gas turbine engine illustrated in FIG. 1.

Referring to FIGS. 2, 4, and 8, a metallic leading edge shield 64 covers an axially or chordwise extending portion 66 of the composite airfoil section 56 including the airfoil leading edge LE and a radially and chordwise extending portion 68 of a leading edge portion 70 of the blade shank 59. The radially and chordwise extending portion 68 of the leading edge portion 70 of the blade shank 59 extends radially outwardly or outboard from the spinner 100. The radially and chordwise extending portion 68 of the leading edge portion 70 of the blade shank 59 may extend radially outwardly or outboard from a maximum radius of the spinner 100 or the aft end radius 44 at the spinner aft end 42. The metallic leading edge shield 64 extends radially inwardly from a airfoil tip 102 towards a base 104 of the composite airfoil section 56 and then along the leading edge portion 70 of the blade shank 59 to the rim 182 of the rotor disk 17. The composite airfoil section 56 and is attached to and preferably integral and integrally formed with a dovetail root 58 with a blade shank 59 therebetween. The metallic leading edge shield 64 protects and covers the airfoil leading edge LE of the composite airfoil section 56 and a shank leading edge SLE of the leading edge portion 70 of the blade shank 59. The leading edge portion 70 of the blade shank 59 may be cut back from the airfoil leading edge LE as illustrated in FIG. 4 forming a blade shank cutback 61. In such a design, the shank leading edge SLE is aft or downstream of the airfoil leading edge LE because the leading edge portion 70 of the blade shank 59 is a "weak link" from a design perspective. The blade shank cutback 61 improves and strengthens the design and makes it more robust. The axial length of the blade dovetail is approximately fixed after balancing other design parameters, and the blade shank cutback 61 helps meet dovetail length requirements.

Referring to FIGS. 3-8, the metallic leading edge shield 64 includes a nose 80 extending along a shield leading edge BLE of the metallic leading edge shield 64. Pressure and suction side legs 82, 84 extend aftwardly or downstream from the nose 80 along the airfoil pressure and suction sides 55, 57 respectively of the composite airfoil section 56 as illustrated in exemplary embodiments of the metallic leading edge shield 64 in FIGS. 5 and 6. The first exemplary embodiment of the metallic leading edge shield 64 illustrated in FIG. 5 has a solid metal nose 80 forward of and covering the airfoil leading edge LE of the composite airfoil section 56 and a portion of the shank leading edge SLE.

Optionally, there may be a space 88 between the metal nose 80 and the airfoil and shank leading edges LE, SLE. The second exemplary embodiment of the metallic leading edge shield 64 illustrated in FIG. 6 includes an insert 90 between the solid metal nose 80 and the airfoil and shank leading edges. The metal nose 80 in the first embodiment is thicker in the axial or chordwise direction in the second embodiment. The first embodiment provides better bird impact capability. The second embodiment provides reduced or minimized impact of the nose overhang weight. The insert 90 functions to make the metal leading edge shield 64 more producible and reduce cost and quality issues. The insert 90 seals a space to prevent air bleed. The insert 90 helps reduce weight from a solid metal nose 80. The insert 90 can be made of various materials including but not limited to an adhesive, epoxy, and metals that are lighter in weight than the nose 80 or may be a hollow structure.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine fan blade comprising:
   a composite blade including a composite airfoil section having airfoil pressure and suction sides extending chordwise or axially between chordwise or axially spaced apart airfoil leading and trailing edges,
   the composite blade further including a dovetail root attached to the composite airfoil section and a blade shank therebetween, and
   a metallic leading edge shield covering an axially extending portion of the composite airfoil section including at least a portion of the airfoil leading edge and further covering a leading edge portion of the blade shank along with a radially and chordwise extending portion of the leading edge portion of the blade shank.

2. The fan blade as claimed in claim 1 further comprising:
   the airfoil section being cambered,
   the dovetail root being axially extending curved or straight, and
   a transition region of the blade shank extending between the airfoil section and the dovetail root and transitioning the composite blade between the cambered airfoil section and the axially extending curved or straight dovetail root.

3. The fan blade as claimed in claim 1 further comprising the leading edge portion of the blade shank being cut back from the airfoil leading edge and a shank leading edge aft or downstream of the airfoil leading edge.

4. The fan blade as claimed in claim 1 further comprising a nose extending along a shield leading edge of the metallic leading edge shield, and pressure and suction side legs extending aftwardly or downstream from the nose along the airfoil pressure and suction sides respectively of the composite airfoil section.

5. The fan blade as claimed in claim 4 further comprising:
   the airfoil section being cambered,
   the dovetail root being axially extending curved or straight, and
   a transition region of the blade shank extending between the airfoil section and the dovetail root and transitioning the composite blade between the cambered airfoil section and the axially extending curved or straight dovetail root.

6. The fan blade as claimed in claim 5 further comprising the leading edge portion of the blade shank being cut back from the airfoil leading edge and a shank leading edge aft or downstream of the airfoil leading edge.

7. The fan blade as claimed in claim 4 further comprising the nose being a substantially solid metal nose.

8. The fan blade as claimed in claim 7 further comprising a space between the nose and the airfoil and shank leading edges.

9. The fan blade as claimed in claim 7 further comprising an insert between the nose and the airfoil and shank leading edges.

10. The fan blade as claimed in claim 9 further comprising the insert made from a group of materials, the group comprising adhesives, epoxies, and metals that are lighter in weight than that of the nose.

11. A gas turbine engine fan assembly comprising:
    a fan rotor disk or drum,
    a row of circumferentially spaced apart composite fan blades extending radially outwardly from the fan rotor disk or drum,
    each of the fan blades including a composite airfoil section having airfoil pressure and suction sides extending chordwise or axially between chordwise or axially spaced apart airfoil leading and trailing edges,
    the composite blade further including a dovetail root attached to the composite airfoil section and a blade shank therebetween, and
    a metallic leading edge shield covering an axially extending portion of the composite airfoil section including at least a portion of the airfoil leading edge and further covering a leading edge portion of the blade shank along with a radially and chordwise extending portion of the leading edge portion of the blade shank.

12. The fan assembly as claimed in claim 11 further comprising a spinner joined to the fan rotor disk or drum and the radially and chordwise extending portion extending radially outwardly or outboard from the spinner.

13. The fan assembly as claimed in claim 11 further comprising:
    the airfoil section being cambered,
    the dovetail root being axially extending curved or straight, and
    a transition region of the blade shank extending between the airfoil section and the dovetail root and transitioning the composite blade between the cambered airfoil section and the axially extending curved or straight dovetail root.

14. The fan assembly as claimed in claim 11 further comprising the leading edge portion of the blade shank being cut back from the airfoil leading edge and a shank leading edge aft or downstream of the airfoil leading edge.

15. The fan assembly as claimed in claim 11 further comprising a nose extending along a shield leading edge of the metallic leading edge shield, and pressure and suction side legs extending aftwardly or downstream from the nose along the airfoil pressure and suction sides respectively of the composite airfoil section.

16. The fan assembly as claimed in claim 15 further comprising:
    the airfoil section being cambered,
    the dovetail root being axially extending curved or straight, and
    a transition region of the blade shank extending between the airfoil section and the dovetail root and transitioning the composite blade between the cambered airfoil section and the axially extending curved or straight dovetail root.

17. The fan assembly as claimed in claim 16 further comprising the leading edge portion of the blade shank being cut back from the airfoil leading edge and a shank leading edge aft or downstream of the airfoil leading edge.

18. The fan assembly as claimed in claim 15 further comprising the nose being a substantially solid metal nose.

19. The fan assembly as claimed in claim 18 further comprising a space between the nose and the airfoil and shank leading edges.

20. The fan assembly as claimed in claim 18 further comprising an insert between the nose and the airfoil and shank leading edges.

21. The fan assembly as claimed in claim 20 further comprising the insert made from a group of materials, the group comprising adhesives, epoxies, and metals that are lighter in weight than that of the nose.

22. The fan assembly as claimed in claim 11 further comprising a spinner joined to the fan rotor disk or drum and the radially and chordwise extending portion extending radially outwardly or outboard from a maximum radius of the spinner at a spinner aft end of the spinner.

* * * * *